(12) United States Patent
Murasaki et al.

(10) Patent No.: US 9,663,007 B2
(45) Date of Patent: May 30, 2017

(54) COVER MATERIAL FASTENING CLIP

(71) Applicant: YKK Corporation, Tokyo (JP)

(72) Inventors: Ryuichi Murasaki, Tokyo (JP); Genta Matsumura, Tokyo (JP); Tomonari Yoshida, Tokyo (JP); Yoshitomo Iyoda, Tokyo (JP); Shinsuke Saiga, Seoul (KR)

(73) Assignee: YKK Corporation (JP)

( * ) Notice: Subject to any disclaimer, the term of this patent is extended or adjusted under 35 U.S.C. 154(b) by 0 days.

(21) Appl. No.: 14/956,597

(22) Filed: Dec. 2, 2015

(65) Prior Publication Data

US 2016/0167554 A1   Jun. 16, 2016

(30) Foreign Application Priority Data

Dec. 10, 2014 (JP) ................................. 2014-249726

(51) Int. Cl.
*B60N 2/58* (2006.01)
*B60N 2/70* (2006.01)
*A47C 31/02* (2006.01)

(52) U.S. Cl.
CPC .......... *B60N 2/5825* (2013.01); *A47C 31/023* (2013.01); *B60N 2/70* (2013.01)

(58) Field of Classification Search
CPC ...... A47C 7/24; A47C 31/023; B60N 2/5825; B60N 2/70
See application file for complete search history.

(56) References Cited

U.S. PATENT DOCUMENTS

| 4,691,416 A | 9/1987 | Nakayama et al. | |
| 4,865,383 A * | 9/1989 | Sbaragli | B60N 2/5825 297/218.2 |
| 6,048,025 A * | 4/2000 | Tillner | A47C 31/023 24/601.2 |
| 6,122,806 A * | 9/2000 | Umezawa | B60N 2/5825 24/546 |
| 6,612,525 B2 * | 9/2003 | Bagdi | F16B 21/02 248/71 |
| 7,487,575 B2 * | 2/2009 | Smith | B60N 2/5825 24/297 |

(Continued)

FOREIGN PATENT DOCUMENTS

| JP | H7-16659 A | 3/1995 |
| JP | 2012-235911 A | 12/2012 |
| WO | 2012/017986 A1 | 2/2012 |

*Primary Examiner* — David Upchurch
(74) *Attorney, Agent, or Firm* — Kilpatrick Townsend & Stockton LLP

(57) ABSTRACT

There is provided a cover material fastening clip for attaching a cover material to a cushion material. The clip is provided with a locking portion, a hook portion and a guide portion. The hook portion is provided with an extending portion that extends downward from the locking portion, a first hook piece a second hook portion. The guide portion is formed in the locking portion or the extending portion and is located above the first and second hook pieces. A space between a leading end portion of the first hook piece and the guide portion serves as a first insertion opening with a predetermined gap into which the wire is inserted. A space between a leading end portion of the second hook piece and the guide portion serves as a second insertion opening with a predetermined gap into which the wire is inserted.

8 Claims, 10 Drawing Sheets

(56) References Cited

U.S. PATENT DOCUMENTS

| | | | | |
|---|---|---|---|---|
| 2003/0213105 A1* | 11/2003 | Bednarski | ............ | B60N 2/5825 24/289 |
| 2005/0006944 A1* | 1/2005 | Ali | ............ | B60N 2/5825 297/452.6 |
| 2007/0257531 A1* | 11/2007 | Mashimo | ............ | B60N 2/5825 297/218.3 |
| 2009/0140569 A1* | 6/2009 | Mashimo | ............ | B60N 2/5825 297/452.59 |
| 2011/0309667 A1* | 12/2011 | Stiller | ............ | B60N 2/5825 297/452.58 |
| 2012/0284974 A1* | 11/2012 | Yamamoto | ............ | A47C 31/023 24/458 |
| 2013/0117973 A1* | 5/2013 | Murasaki | ............ | A47C 31/023 24/581.11 |
| 2013/0247338 A1* | 9/2013 | Santin | ............ | F16B 2/22 24/545 |
| 2014/0352117 A1* | 12/2014 | Murasaki | ............ | A47C 31/023 24/581.11 |

* cited by examiner

COVER MATERIAL FASTENING CLIP

CROSS-REFERENCE TO RELATED APPLICATION

The present application claims priority of Japanese Patent Application No. 2014-249726, filed on Dec. 10, 2014 and entitled "Cover Material Fastening Clip", the entire contents of which are hereby incorporated by reference.

TECHNICAL FIELD

The present invention relates to a cover material fastening clip which is used to fasten a cover material covering the surface of a chair, a seat, or the like.

BACKGROUND

In the related art, in a chair used in a room, a seat in a vehicle, or the like, a cushion material or a soft pad is frequently used in a portion to be touched by a human body, such as a seat surface or a back rest, and the surface thereof is covered with a cover material. Various structures are employed for fastening such a cover material. As a structure capable of fastening the cover material and visually being concealed, there has been known a structure in which a wire is disposed in a groove of the cushion material, clips are arranged at predetermined positions of an edge of the cover material, and the clips are engaged with the wire to fasten the cover material.

For example, cover material fastening clips disclosed in Patent Document 1 and Patent Document 2 include a chuck portion that is hooked to a locking end portion attached to a cover material and a hook portion that is hooked and locked to a wire disposed in a groove of a cushion material. The hook portion includes a guide piece and a hook piece which are disposed to face each other in parallel, the guide piece is bent outward to enlarge a gap between the hook piece and the guide piece by inserting the wire therebetween, and the hook piece is hooked and locked to the wired inserted into the gap when the wire is further inserted.

As a structure in which a hook is hooked to a wire to fasten a cover material, there has been known a hook member disclosed in Patent Document 3. In this structure, a cantilever-shaped closing piece capable of being elastically deformed is disposed in an opening formed on the top of the hook. As disclosed in Patent Document 4, there has been suggested a structure in which a hook having a pair of locking claws having the same shape is disposed on both sides of a hanging member attached to a cover material.

Patent Document 1: Japanese Patent Application Publication No. 2012-235911A

Patent Document 2: PCT Publication No. WO2012/017986

Patent Document 3: U.S. Pat. No. 4,691,416

Patent Document 4: Japanese Utility Model Application Publication No. H7-16659A

In the cover material fastening clips disclosed in Patent Document 1 and Patent Document 2 in the related art, since the guide piece extends long, it is difficult to engage with the wire. That is, when the cover material fastening clip in a tilted state approach the wire, the guide piece and the hook piece extend downward to be close to each other. Accordingly, the wire is located outside the guide piece and thus the wire may not be hooked to the hook piece. In this case, the posture of the hook piece needs to be changed and the hook piece needs to be inserted again, thereby making an operation of locking the hook piece troublesome. In addition, since the range in which the wire can be inserted into the hook piece is narrow, the surrounding cushion material or the like needs to be stretched and deformed to make the wire appear for the purpose of accurate insertion. Accordingly, workability was poor and the operation was not easy. Particularly, when the cover material fastening clip is pressed and hooked to the wire with a finger, the cover material fastening clip is likely to be inclined such that the guide piece is located downside and the wire is likely to be located outside the guide piece. Accordingly, it is difficult to engage the wire with the hook piece.

In the hook member disclosed in Patent Document 3, since the locking opening is formed in the top of the hook, the hook has to be pressed up to below the wire so as to lock and unlock the wire. Accordingly, a large force is required and it is difficult to use the hook member. In addition, the opening is closed with the closing piece. Accordingly, when the hook member is removed from the wire, the operation has to be carried out while holding the closing piece in an opened state and thus it is difficult to carry out the operation.

In the locking claws disclosed in Patent Document 4, similarly to the hook member disclosed in Patent Document 3, since the locking opening is formed in the top of the hook, the wire is locked by pressing the hook up to below the wire and then raising the hook. However, since it is difficult to see the position of the wire, it is difficult to engage the wire with the hook.

SUMMARY

It is therefore an object of the present invention to provide a cover material fastening clip that can be locked to a wire in a cushion material or the like with a simple operation and that has excellent working efficiency.

According to an aspect of the embodiments of the present invention, there is provided a cover material fastening clip for attaching a cover material to a cushion material, comprising: a locking portion configured to be locked to a locking end member disposed at an edge of the cover material; a hook portion configured to locked to a wire disposed in a groove of the cushion material; and a guide portion configured to guide the wire to the hook portion, wherein the hook portion is formed below the locking portion and the hook portion is provided with an extending portion that extends downward from the locking portion, a first hook piece that extends laterally from a leading end portion of the extending portion in an extending direction thereof, and a second hook portion that extends to an opposite side of the first hook piece, wherein the guide portion is formed in the locking portion or the extending portion and is located above the first hook piece and the second hook piece, wherein a space between a leading end portion of the first hook piece and the guide portion serves as a first insertion opening with a predetermined gap into which the wire is inserted, and wherein a space between a leading end portion of the second hook piece and the guide portion serves as a second insertion opening with a predetermined gap into which the wire is inserted.

In the cover material fastening clip, a portion of the guide portion facing the first insertion opening may form a first upper guide surface, a portion of the first hook piece facing the first insertion opening may form a first lower guide surface, a gap between the first upper guide surface and the first lower guide surface may be gradually narrowed toward the first insertion opening, a portion of the guide portion facing the second insertion opening may form a second upper guide surface, a portion of the second hook piece facing the second insertion opening may form a second lower guide surface, and a gap between the second upper guide surface and the second lower guide surface may be gradually narrowed toward the second insertion opening.

In the cover material fastening clip, an inclined surface inclined upwardly toward a lateral side from the extending portion may be formed at an end portion of the first hook piece in the extending direction of the extending portion, and an inclined surface inclined upwardly toward a lateral side from the extending portion may be formed at an end portion of the second hook piece in the extending direction of the extending portion.

In the cover material fastening clip, the first upper guide surface and the first lower guide surface may be arranged such that extension lines thereof intersect each other at an angle of 80° to 120°, and the second upper guide surface and the second lower guide surface may be arranged such that extension lines thereof intersect each other at an angle of 80° to 120°.

In the cover material fastening clip, the first hook piece and the second hook piece and the guide portion may be formed to be symmetric with respect to a center line of the extending portion in the extending direction thereof. In the cover material fastening clip, the first hook piece and the second hook piece may be arranged so as to lock a jig for removing the first hook piece and the second hook piece from the wire. In the cover material fastening clip, a holding space for holding the wire may be formed in the first hook piece and the second hook piece, and a jig groove to which the jig is fitted may be formed on a bottom portion of the holding space.

In the cover material fastening clip according to the aspect of the embodiments of the present invention, it is possible to easily lock the hook portion to the wire in a cushion material or the like with a simple operation and thus to surely install the cover material in the cushion material. Even when the cover material fastening clip is inclined by pressing the cover material fastening clip from the upper side with a finger in a locking operation, the wire can be easily and satisfactorily hooked to the hook portion in the inclined state and thus working efficiency is good. Since the leading passage is formed toward the insertion opening of the hook portion into which the wire is inserted such that the extensions of a pair of guide surfaces intersect each other, it is not necessary to accurately position the wire and it is possible to guide the wire in a wide range. Accordingly, it is possible to satisfactorily guide and hook the wire to the insertion opening.

Since the leading end portions of the first upper guide surface and the second upper guide surface extend laterally from the leading end portion of the first hook piece or the second hook piece, it is possible to easily and satisfactorily guide the wire to the locking position in the holding space and to decrease a movable range of the wire in the locked state to easily maintain the locked state.

DETAILED DESCRIPTION

Figure 1:
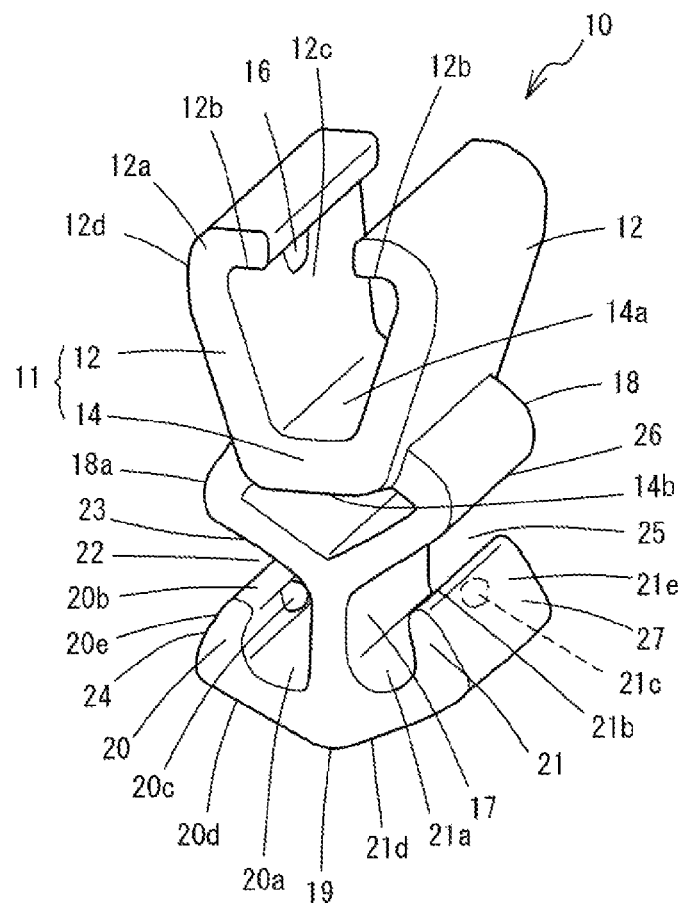
FIG. 1 is a perspective view of a cover material fastening clip according to a first embodiment of the present invention.

Hereinafter, embodiments of the present invention will be described with reference to the accompanying drawings. In describing a cover material fastening clip 10, directions are defined with reference to X, Y, and Z axis directions perpendicular to each other illustrated in FIG. 3. Here, the X axis direction is defined as a front-rear direction, for example, which corresponds to an extending direction of a wire 36 located in a deep position of a groove 34 of a cushion material 30 to be described later or corresponds to the direction parallel to an edge of a cover material 32. The front-rear direction corresponds to the direction parallel to an edge of a locking end member 42 to be described later. The direction in which the locking end member 42 is inserted into the groove 34 of the cushion material 30 and is locked to the wire 36 is defined as a vertical direction. The vertical direction is the Z axis direction perpendicular to the X axis and corresponds to the depth direction of the cushion material 30. The vertical direction corresponds to the direction perpendicular to the outer surface of the cover material 32 (to be described later) attached to the cushion material 30. The direction perpendicular to the X axis direction as the front-rear direction and the Z axis direction as the vertical direction is defined as the Y axis direction and is referred to as a horizontal direction. The direction parallel to the horizontal direction is also referred to as a lateral direction.

Figure 2:
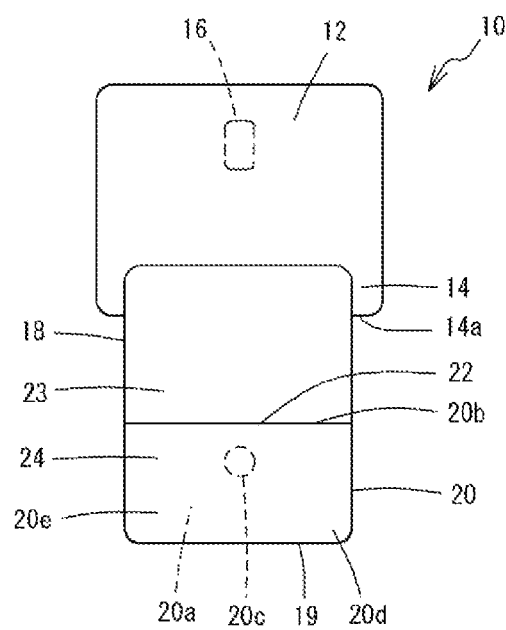
FIG. 2 is a right side view of the cover material fastening clip according to the first embodiment of the present invention.

FIGS. 1 and 2 illustrate a first embodiment of the present invention, the cover material fastening clip 10 according to this embodiment is formed as a unified body out of a synthetic resin and includes a pair of locking claws 12. The locking claws 12 include arms 12d which are formed to face each other. Base end portions of the arms 12d (base end portions of the locking claws 12) are formed as a unified body on both sides of a top surface 14a of a locking claw base portion 14 (also referred to as one surface of the locking claw base portion 14). The locking claws 12 protrude from the top surface 14a upward in FIG. 1 and are formed such that a gap in the horizontal direction therebetween increases upward. A locking portion 11 is constituted by the locking claws 12 and the locking claw base portion 14. Leading end portions 12a of the locking claws 12 are bent inward, that is, in a direction in which both approach each other. Each leading end portion 12a includes a locking surface 12b which is located at the opposite end portion of the locking claw base portion 14 and which locks a locking end member 42. The locking surfaces 12b are formed to be substantially parallel to the top surface 14a of the locking claw base portion 14. The locking end member 42 is received and locked in a space which is surrounded with the pair of locking claws 12 and the locking claw base portion 14.

A stopper 16 is formed on opposing inner surfaces 12c of the arms 12d of the pair of locking claws 12. The stoppers 16 are protrusions formed at an intermediate position in the thickness direction as the X axis direction intersecting the opposing direction of the locking claws 12 and are disposed from the locking surfaces 12b of the locking claws 12 to the tops of the inner surfaces 12c.

On a bottom surface 14b (also referred to as the other surface of the locking claw base portion 14) of the locking claw base portion 14 opposite to the top surface 14a, a guide portion 18 extending from both end portions of the bottom surface 14b in the opposing direction of the pair of locking claws 12 are integrally formed. The guide portion 18 is formed in a rhombic shape in which a pair of sides protrude downward from the bottom surface 14b thereof, extend to increase a gap therebetween as both sides are separated away from the bottom surface 14b, and are bent to be inclined to approach each other in the middle way thereof. The hook portion 19 is formed on the side of the guide portion 18 opposite to the bottom surface 14b.

An extending portion 17 that extends downward from the corner located at the lower end portion of the rhombic shape of the guide portion 18 to be substantially perpendicular to the bottom surface 14b of the locking portion 11 is formed in the hook portion 19, and a first hook piece 20 protruding to one side in the horizontal direction from the bottom end portion in the vertical direction which is the extending direction of the extending portion 17 is formed. The first hook piece 20 has a shape in which the portion connected to the extending portion 17 extends upward as it is separated away from the extending portion 17 and is bent in the middle and a leading end portion 20b thereof reaches the vicinity of the guide portion 18. The space between the first hook piece 20 and the extending portion 17 forms a U-shaped groove and serves as a holding space 20a into which a wire 36 or a jig 46 to be described later is inserted. On the inner surface of the holding space 20a of the first hook piece 20, an engaging protrusion 20c to which the wire 36 or the jig 46 is locked is formed in the vicinity of the leading end portion 20b of the first hook piece 20, and the engaging protrusion 20c is formed to protrude in a semispherical shape from the inner surface of the holding space 20a. The outer surface of the first hook piece 20 on the side opposite to the holding space 20a includes an inclined surface 20d connected to the extending portion 17 and a contact surface 20e which is connected to the inclined surface 20d, is bent, and extends toward the guide portion 18. The inclined surface 20d and the contact surface 20e are formed to be planar and are connected to each other at different angles. The leading end portion 20b of the first hook piece 20 is tapered and rounded. The inclined surface 20d is not limited to the planar shape, but may have a curved shape which is convex downward or concave upward.

The gap between the guide portion 18 and the leading end portion 20b of the first hook piece 20 serves as a first insertion opening 22 into which the wire 36 or the jig 46 is inserted. The diameter of the first insertion opening 22 is set to be smaller than the diameter of the wire 36 or the jig 46. The lower side surface of the guide portion 18 facing the leading end portion 20b of the first hook piece 20 serves as a first upper guide surface 23 which is inclined toward the bottom portion of the holding space 20a. The contact surface 20e of the first hook piece 20 serves as a first lower guide surface 24 which is inclined toward the first insertion opening 22.

Figure 6:
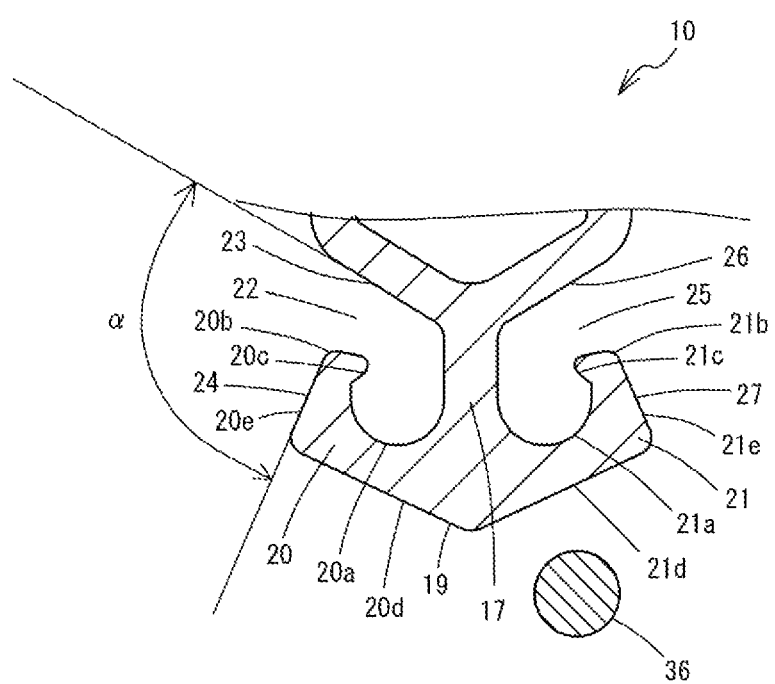
FIG. 6 is an enlarged cross-sectional view of the cover material fastening clip according to the first embodiment of the present invention.

As illustrated in FIG. 6, a triangular leading passage including two surfaces between which a gap gradually decreases toward the first insertion opening 22 and which intersect each other at an angle of about 80° to 120°, preferably, at an angle α slightly greater than 90°, is formed by the first upper guide surface 23 and the first lower guide surface 24. The first upper guide surface 23 intersects the extension line of the leading end portion 20b of the first hook piece 20, extends to the side of one locking claw 12 and the outside in the horizontal direction of the extending portion 17, is located outside in the horizontal direction, and is located above the holding space 20a. Accordingly, when the wire 36 or the jig 46 is inserted, the wire 36 or the jig 46 is smoothly guided to the holding space 20a. In addition, the angle formed by the Y axis direction as the horizontal direction and the first upper guide surface 23 is smaller than the angle formed by the first lower guide surface 24 and the Y axis direction. Accordingly, the wire 36 is likely to come in contact with the first upper guide surface 23. Since the angle of the first lower guide surface 24 is relatively large, the wire 36 can easily enter the holding space 20a even when the inclination angle of the cover material fastening clip 10 is small at the time of attachment. The engaging protrusion 20c suppresses easy movement of the wire 36 or the jig 46 in the locked state, thereby maintaining stable locking.

A second hook piece 21 protruding in the horizontal direction which is opposite to the protruding direction of the first hook piece 20 is formed at the lower end portion of the extending portion 17 of the hook portion 19, and the second hook piece 21 and the first hook piece 20 are formed to be symmetric with respect to the extending portion 17. The second hook piece 21 has a shape in which the portion connected to the extending portion 17 extends upward as it is separated away from the extending portion 17 and is bent in the middle and a leading end portion 21b thereof reaches the vicinity of the guide portion 18. The space between the second hook piece 21 and the extending portion 17 forms a U-shaped groove and serves as a holding space 21a, and an engaging protrusion 21c is formed on the inner surface of the holding space 21a of the second hook piece 21. The outer surface of the second hook piece 21 on the side opposite to the holding space 21a includes an inclined surface 21d connected to the extending portion 17 and a contact surface 21e which is connected to the inclined surface 21d, is bent, and extends toward the guide portion 18. The leading end portion 21b of the second hook piece 21 is tapered and rounded.

The gap between the guide portion 18 and the leading end portion 21b of the second hook piece 21 serves as a second insertion opening 25 into which the wire 36 or the jig 46 is inserted. The diameter of the second insertion opening 25 is set to be smaller than the diameter of the wire 36 or the jig 46. The lower side surface of the guide portion 18 facing the leading end portion 21b of the second hook piece 21 serves as a second upper guide surface 26 which is inclined toward the bottom portion of the holding space 21a. The contact surface 21e of the second hook piece 21 also serves as a second lower guide surface 27 which is inclined toward the second insertion opening 25.

As illustrated in FIG. 6, a triangular leading passage including two surfaces between which a gap gradually decreases toward the second insertion opening 25 and which intersect each other at an angle of about 80° to 120°, preferably, at an angle α slightly greater than 90°, is formed by the second upper guide surface 26 and the second lower guide surface 27. The second upper guide surface 26 intersects the extension line of the leading end portion 21b of the second hook piece 21, extends to the side of one locking claw 12 and the outside in the horizontal direction of the extending portion 17, is located outside in the horizontal direction, and is located above the holding space 21a. Accordingly, when the wire 36 or the jig 46 is inserted, the wire 36 or the jig 46 is smoothly guided to the holding space 21a. In addition, the angle formed by the Y axis direction as the horizontal direction and the second upper guide surface 26 is smaller than the angle formed by the second lower guide surface 27 and the Y axis direction. Accordingly, the wire 36 is likely to come in contact with the second upper guide surface 26. Since the angle of the second lower guide surface 27 is relatively large, the wire 36 can easily enter the holding space 21a even when the inclination angle of the cover material fastening clip 10 is small at the time of attachment. The engaging protrusion 21c suppresses easy movement of the wire 36 or the jig 46 in the locked state, thereby maintaining stable locking.

Usage of the cover material fastening clip 10 according to this embodiment will be described below with reference to FIGS. 3 to 9. The cover material fastening clip 10 is used to attach a cover material 32 to a predetermined position on a surface of a cushion material 30 of a seat in a vehicle. Now, the cushion material 30 and the cover material 32 will be described. The cushion material 30 is a synthetic resin foam member of foamed polyurethane or the like shaped in a seat shape. A cover material fastening groove 34 is formed in the cushion material 30, and a wire 36 is disposed in the groove 34. The wire 36 is a wire member formed of metal and can be incorporated by insert molding at the time of molding the cushion material 30.

Figure 3:
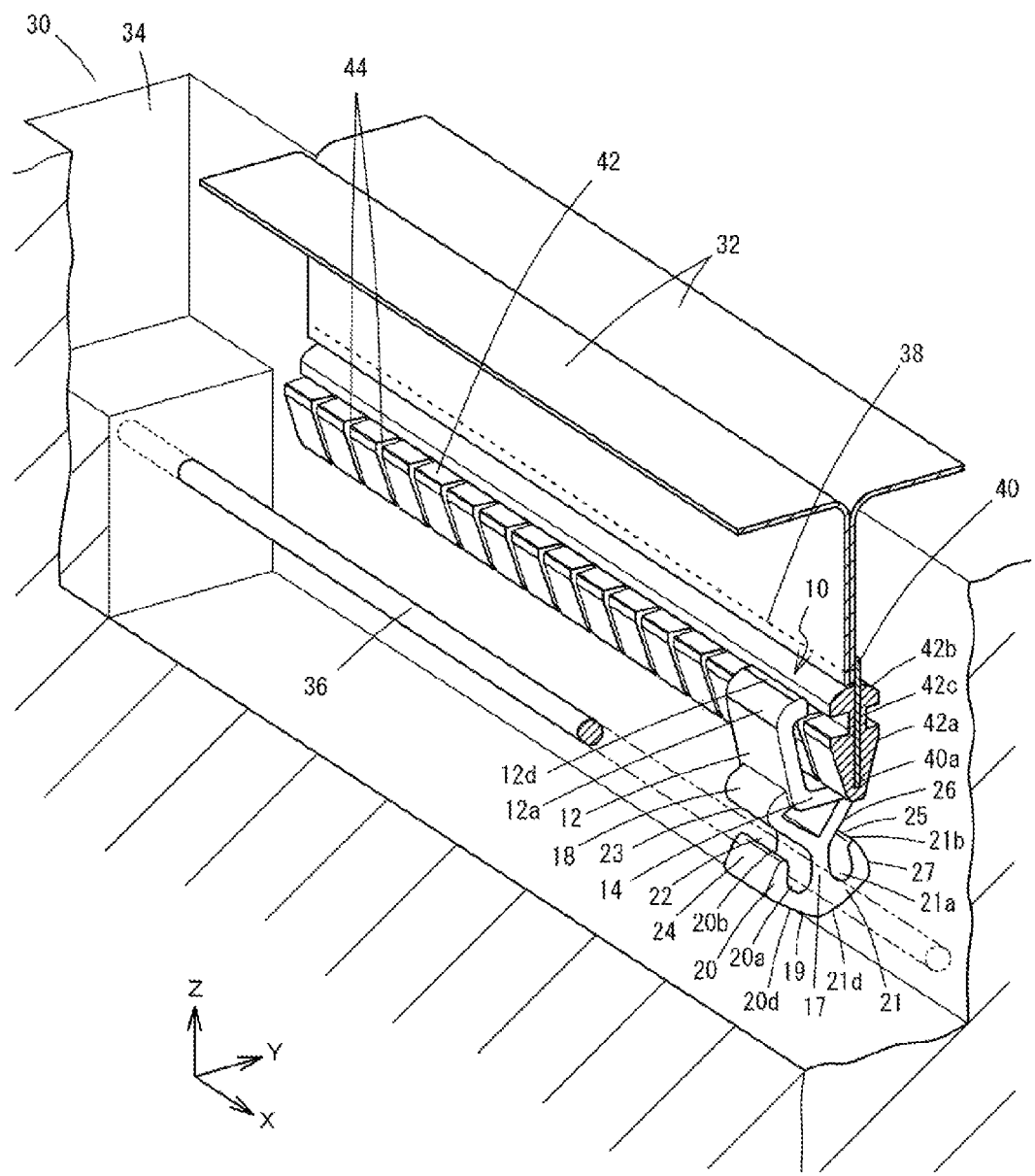
FIG. 3 is a perspective view illustrating usage of the cover material fastening clip according to the first embodiment of the present invention.
Figure 5:
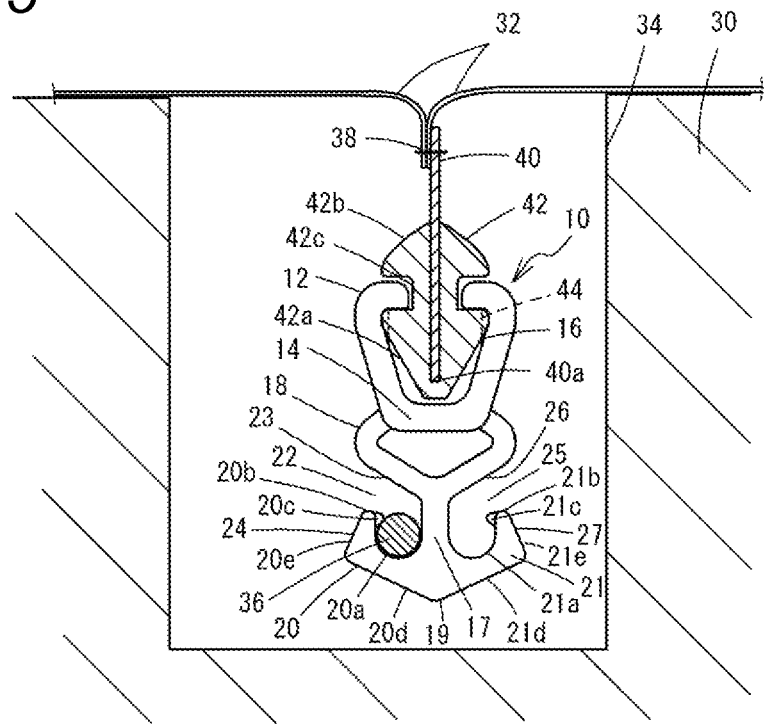
FIG. 5 is a front view illustrating the usage of the cover material fastening clip according to the first embodiment of the present invention.

As illustrated in FIGS. 3 and 5, the cover material 32 is a synthetic resin sheet or the like covering the surface of the cushion material 30 and includes a suturing portion 38 in a portion corresponding to the groove 34 of the cushion material 30. The suturing portion 38 is formed by matching edges of a pair of cover materials 32 to as to be folded and superposing and suturing a locking tape 40 thereon. An edge 40a of the locking tape 40 opposite to the suturing portion 38 is integrally provided with a locking end member 42.

Figure 4:
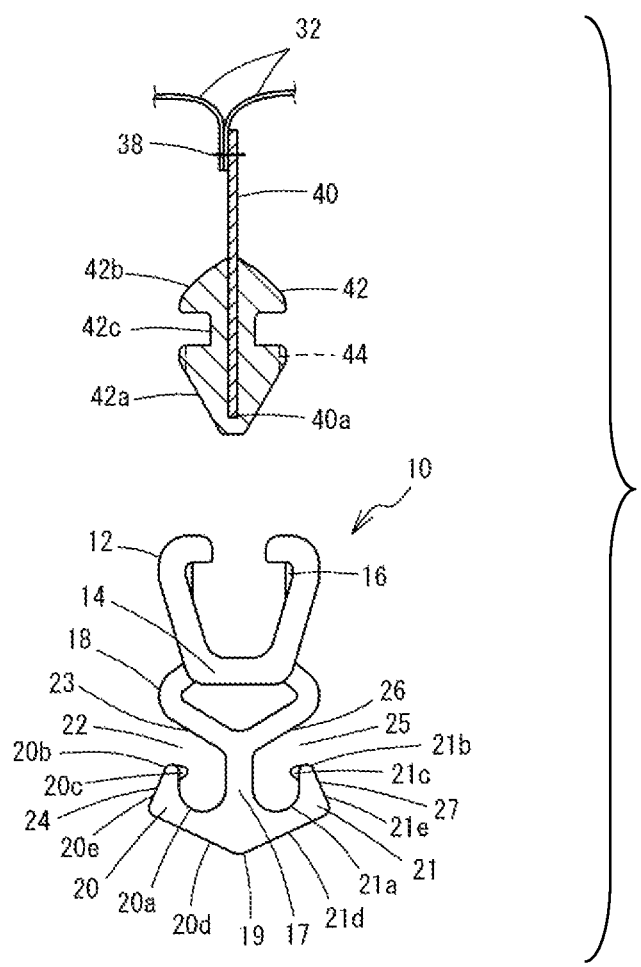
FIG. 4 is a front view illustrating the usage of the cover material fastening clip according to the first embodiment of the present invention.

The locking end member 42 is formed of a synthetic resin, is attached to the locking tape 40 by insert-molding one edge of the locking tape 40, and is formed in a constant shape along the length direction of the locking tape 40. As illustrated in FIGS. 3 to 5, the sectional shape of the locking end member 42 is symmetric with respect to the locking tape 40, a portion in which the edge 40a is embedded is a V-shaped portion 42a having a substantially V shape, a portion on the cover material 32 side is a swelling portion 42b swelling to the cover material 32, and concave portions 42c into which leading end portions 12a of the locking claws 12 of the cover material fastening clip 10 are inserted and locked are formed in the middle between the V-shaped portion 42a and the swelling portion 42b. Locking grooves 44 are formed in the V-shaped portion 42a at constant intervals along the length direction of the locking tape 40. The locking grooves 44 are set to have a width and a depth into which the stoppers 16 of the cover material fastening clip 10 are inserted.

When the cover material 32 is attached to the cushion material 30, first, the cover material fastening clip 10 is attached to an arbitrary position of the locking end member 42 of the locking tape 40 attached to the cover material 32. Plural cover material fastening clips 10 are attached at predetermined intervals along the length direction of the locking end member 42. In this attachment, when the V-shaped portion 42a of the locking end member 42 is pressed between the pair of locking claws 12, the locking claws 12 are elastically deformed to increase a gap therebetween. When the V-shaped portion 42a passes through the locking claws 12, the elastic deformation of the locking claws 12 is restored and the leading end portions 12a of the locking claws 12 are inserted and locked into the concave portions 42c and are not dropped therefrom. At this time, the stoppers 16 of the locking claws 12 are inserted into the locking grooves 44 of the locking end member 42, and the cover material fastening clip 10 is stopped at a predetermined position without moving in the length direction of the locking end member 42.

Figure 7:
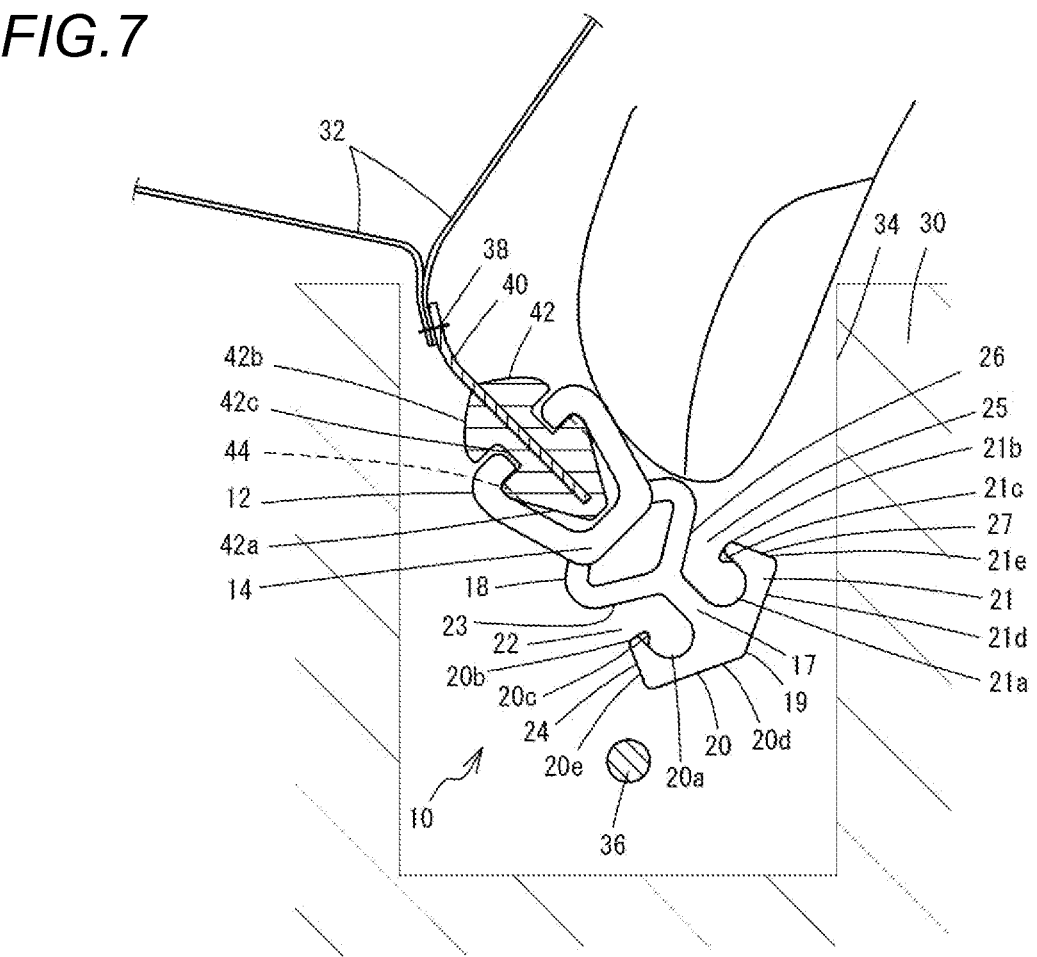
FIG. 7 is a front view illustrating a step of attaching the cover material fastening clip according to the first embodiment of the present invention to a wire.

A step of attaching the cover material 32 having the cover material fastening clip 10 attached thereto to a target cushion material 30 will be described with reference to an example in which the wire 36 is attached to the first hook piece 20 of the cover material fastening clip 10. As illustrated in FIG. 7, the suturing portion 38 of the cover material 32 having the cover material fastening clip 10 attached thereto is matched with the groove 34 of the target cushion material 30, and the hook portion 19 of the cover material fastening clip 10 is pressed against the wire 36 with a finger and the like. At this time, the cover material fastening clip 10 can be moved horizontally so as to match the wire 36 with the first insertion opening 22. When the cover material fastening clip 10 is further pressed in this state, the wire 36 is guided between the first upper guide surface 23 and the first lower guide surface 24 on the first insertion opening 22 side of the first hook piece 20. When the cover material fastening clip 10 is further pressed and is inserted deep into the groove 34 of the cushion material 30, the wire 36 is guided to the first insertion opening 22 along the first upper guide surface 23 or the first lower guide surface 24. The first insertion opening 22 has a diameter smaller than the diameter of wire 36 and cannot pass the wire 36 without any change. However, when the cover material fastening clip 10 is additionally pressed down in this state, the first hook piece 20 is elastically deformed such that the first insertion opening 22 is enlarged to the diameter of the wire 36, passes through the first insertion opening 22, and enters the holding space 20a. After the wire 36 passes through the first insertion opening, the elastic deformation of the first hook piece 20 is restored and the first insertion opening 22 is returned to a narrow state to prevent dropping of the wire 36. Since the engaging protrusion 20c is formed to protrude in the vicinity of the first insertion opening 22, it is possible to satisfactorily prevent dropping of the wire 36. Accordingly, the cover material fastening clip 10 is locked to the wire 36, and the cover material 32 attached to the cover material fastening clip 10 is attached to the surface of the cushion material 30 in a state in which the edge thereof is embedded in the groove 34.

Figure 8:
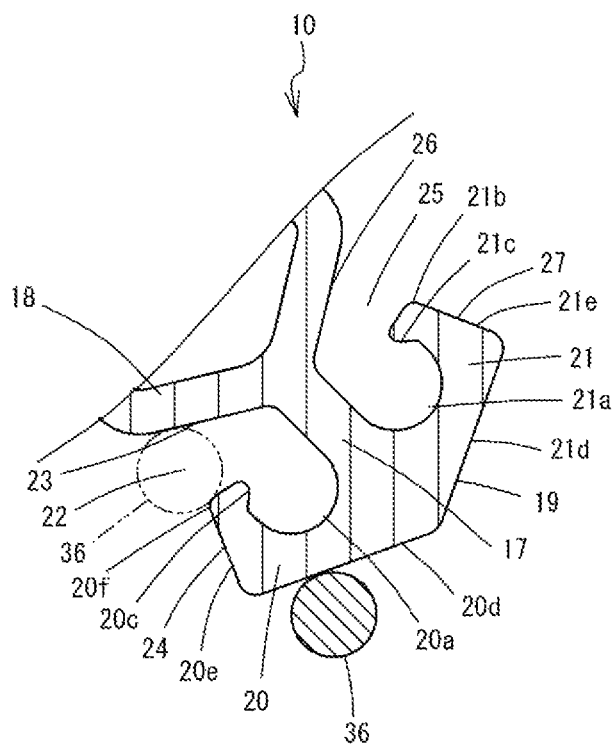
FIG. 8 is an enlarged cross-sectional view illustrating a step of attaching the cover material fastening clip according to the first embodiment of the present invention to the wire.

As illustrated in FIG. 8, even when the wire 36 is located on the right side of the first insertion opening 22 in the drawing, the cover material fastening clip 10 is inclined, and the wire 36 comes in contact with the inclined surface 20d of the first hook piece 20 in holding and attaching the cover material fastening clip 10 with a fingertip, the cover material fastening clip 10 moves to rotate in the counterclockwise direction in the drawing by pressing the locking portion 11, the wire 36 is guided from the inclined surface 20d to the first lower guide surface 24, is guided to the first insertion opening 22, and moves to the position of the wire 36 indicated by a two-dot chained line. When the cover material fastening clip 10 is pressed down in this state, the wire 36 is guided to the first insertion opening 22 along the first upper guide surface 23, the first hook piece 20 is pressed and elastically deformed to be separated away from the guide portion 18 by the wire 36, the first insertion opening 22 is enlarged, and the wire 36 is inserted and locked into the holding space 20a.

Figure 9:
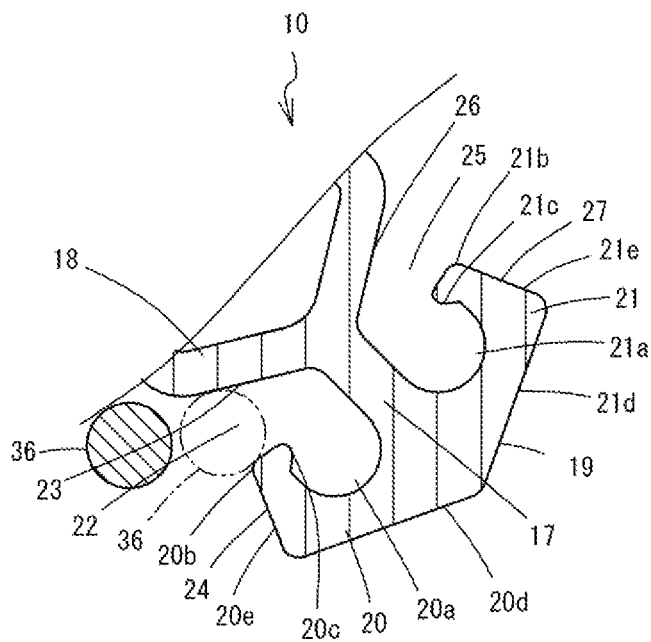
FIG. 9 is an enlarged cross-sectional view illustrating a step of attaching the cover material fastening clip according to the first embodiment of the present invention to the wire.

When the wire 36 is located on the left side of the first insertion opening 22 in the drawing as illustrated in FIG. 9, the wire 36 comes in contact with the first upper guide surface 23 of the guide portion 18. By additionally pressing the cover material fastening clip 10 to move to the left side along the first upper guide surface 23, the wire 36 can be matched with the vicinity of the first insertion opening 22 and the wire 36 can be inserted and locked into the holding space 20a by the same operation as described above.

An example in which the wire 36 is locked to the first hook piece 20 is described herein, but the wire 36 may be locked to the second hook piece 21. In this case, the wire is locked in the same process as described above.

Figure 10:
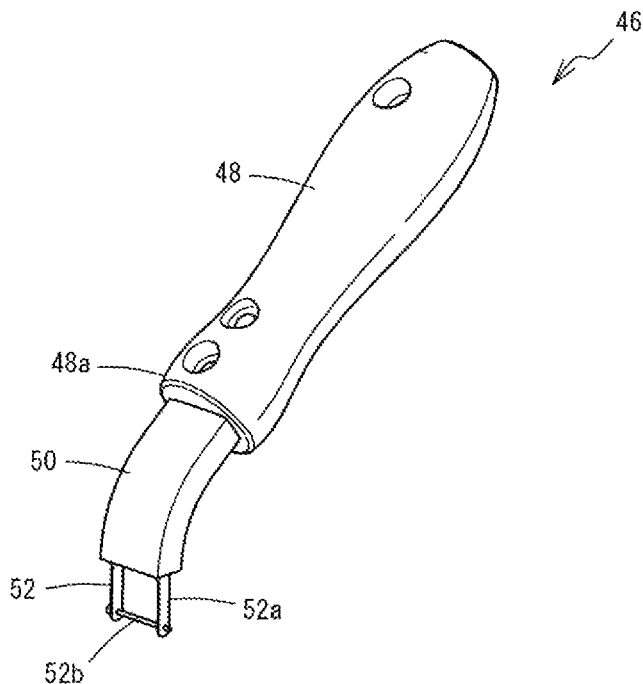
FIG. 10 is a perspective view illustrating a jig which is used to remove the cover material fastening clip according to the first embodiment of the present invention from the wire.

A jig 46 illustrated in FIG. 10 is used to remove the cover material fastening clip 10 from the wire 36. The jig 46 will be described below. The jig 46 includes a holding portion 48 having a rod shape which is formed long in one direction and an insertion portion 50 having a flat quadrangular prism shape which is formed at one end portion 48a of the holding portion 48. The insertion portion 50 protrudes laterally to be parallel to the length direction of the holding portion 48, and a sectional shape perpendicular to the protruding direction is a rectangular shape which is long in one direction. An engaging member 52 is disposed at a leading end portion of the insertion portion 50. The engaging member 52 includes a pair of rod-shaped support portions 52a attached to the vicinity of the short side of the rectangular shape of the insertion portion 50 and a rod-shaped locking portion 52b connected to the leading end portions of the pair of support portions 52a. The locking portion 52b has preferably a cylindrical shape of which the sectional shape is circular, but does not have to be true circular and may be elliptical or polygonal such as triangular. The direction of the locking portion 52b connecting the support portions 52a corresponds to the direction in which the wire 36 in a state in which the jig 46 is locked to the cover material fastening clip 10 and the cover material fastening clip 10 is locked to the wire 36 extends or corresponds to the front-rear direction of the cover material fastening clip 10, that is, the X axis direction. The gap between the pair of support portions 52a is larger than the size in the front-rear direction, that is, in the X axis direction, of the first hook piece 20 or the second hook piece 21, and the size between the locking portion 52b and the leading end portion of the insertion portion 50 is larger than the depth from the first insertion opening 22 and the second insertion opening 25 to the bottom portions of the holding spaces 20a and 21a. Accordingly, when the cover material fastening clip 10 rotates about the locking portion 52b in a state in which the locking portion 52b of the jig 46 is locked to the holding space 20a or 21a, the cover material fastening clip 10 can be smoothly rotated without interfering with the support portions 52a and can be removed from the wire 36. The insertion portion 50 is slowly curved in one direction intersecting the locking portion 52b.

Figure 11:
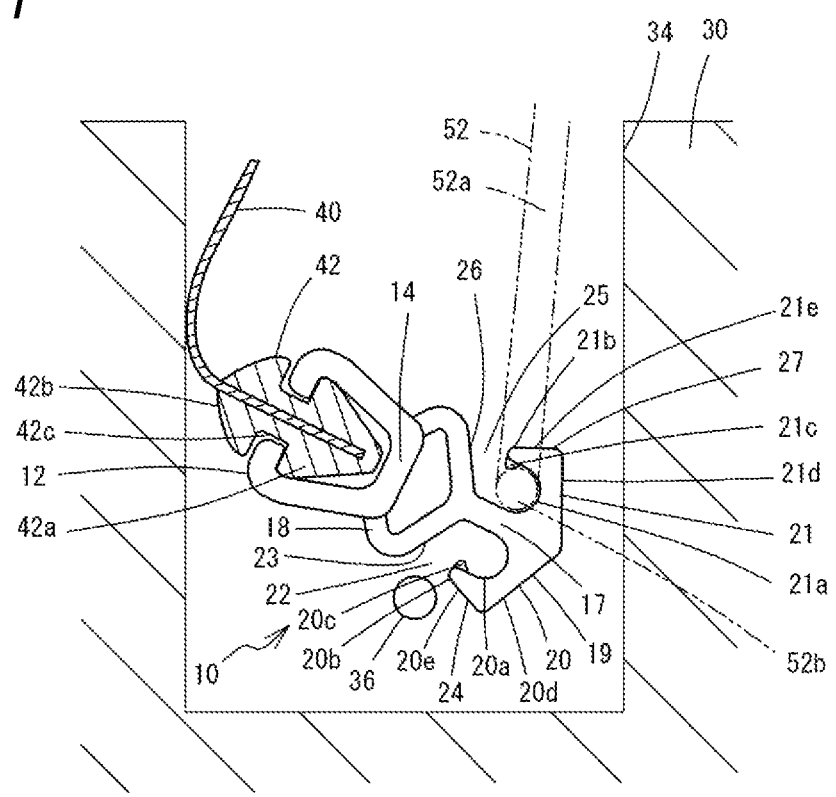
FIG. 11 is a front view illustrating a step of removing the cover material fastening clip according to the first embodiment of the present invention from the wire.

A step of removing the cover material fastening clip 10 from the wire 36 will be described below with reference to an example in which the wire 36 is attached to the first hook piece 20 of the cover material fastening clip 10. As illustrated in FIG. 11, the jig 46 is inserted into the side of the cover material fastening clip 10 opposite to the wire 36 in the groove 34 of the cushion material 30 and the locking portion 52b of the locking member 52 is pressed against the second insertion opening 25 of the second hook piece 21 which does not engage with the wire 36. The second insertion opening 25 has a diameter smaller than the diameter of the locking portion 52b and the locking portion 52b cannot pass therethrough without any change. However, when the jig 46 is additionally pushed upward in this state, the second hook piece 21 is elastically deformed, the second insertion opening 25 is enlarged to the diameter of the locking portion 52b, and the locking portion 52b is inserted into the holding space 21a through the second insertion opening 25. After the locking portion 52b is inserted, the elastic deformation of the second hook piece 21 is restored and the second insertion opening 25 is returned to a narrowed state to prevent dropping of the locking portion 52b. Accordingly, the jig 46 is locked to the cover material fastening clip 10. Since the engaging protrusion 21c is formed to protrude in the vicinity of the second insertion opening 25, it is possible to satisfactorily prevent dropping of the locking portion 52b.

Then, the jig 46 is raised. Here, the direction in which the jig 46 is raised corresponds to the vertical direction of the cover material fastening clip 10, that is, the Z axis direction and also corresponds to the depth direction of the groove 34 of the cushion material 30. With respect to the bottom in the depth direction of the groove 34 of the cushion material 30, the opposite direction of the direction in which the locking end member 42 is inserted into the groove 34 and the direction in which the jig 46 is raised correspond to each other. When the jig 46 is raised, the locking portion 52b of the jig 46 is held and is not removed by the engaging protrusion 21c in the holding space 21a as illustrated in FIG. 11. Accordingly, a moment is applied to the cover material fastening clip 10 so as to rotate in the counterclockwise direction about the wire 36 with the movement of the locking portion 52b. The wire 36 is located in the first insertion opening 22, the wire 36 comes in contact with the engaging protrusion 20c when the cover material fastening clip 10 is raised, and a force acts in the direction in which the first hook piece 20 is opened. Accordingly, the first hook piece 20 is elastically deformed, the wire 36 passes through the first insertion opening 22, the cover material fastening clip 10 is removed from the wire 36, and the cover material 32 is removed from the cushion material 30. The jig 46 is locked to the holding space 21a even after the cover material fastening clip 10 is removed from the wire 36, but can be easily removed with a hand by opening the second hook piece 21 outward. Accordingly, the force with which the jig 46 is held in the holding space 21a when the cover material fastening clip 10 is inclined as illustrated in FIG. 11 is larger than the force with which the wire 36 is locked to the holding space 21a, and has a magnitude enough to be easily removed with a hand or the like.

Here, an example in which the jig 46 is locked to the second hook piece 21 and the cover material fastening clip 10 is removed from the wire 36 is described, but when the wire 36 is locked to the second hook piece 21, the jig 46 can be locked to the first hook piece 20 and the cover material fastening clip 10 can be removed from the wire 36 in the same step.

According to this embodiment, it is possible to lock the cover material fastening clip 10 to the wire 36 of the cushion material 30 and to easily and satisfactorily attach the cover material 32 to the cushion material 30. Particularly, when the cover material fastening clip 10 is held with a finger and is inserted into the groove 34 of the cushion material 30 by pressing one of the first hook piece 20 and the second hook piece 21, the pressing is carried out against the force attracted to the cover material 32 and thus the whole cover material fastening clip 10 may be inclined. However, even in the inclined state, since the first insertion opening 22 or the second insertion opening 25 faces the downside and the triangular leading passage between the first upper guide surface 23 and the first lower guide surface 24 or between the second upper guide surface 26 and the second lower guide surface 27 facing the first insertion opening 22 or the second insertion opening 25 is enlarged downward, the cover material fastening clip 10 can be easily locked to the wire 36 by only pressing the cover material fastening clip 10 against the wire 36 in the vicinity of the first insertion opening 22 or the second insertion opening 25. Even when the wire 36 departs from the first insertion opening 22 or the second insertion opening 25, the wire 36 can be guided by the first upper guide surface 23 and the first lower guide surface 24 or the second upper guide surface 26 and the second lower guide surface 27 so as to match the first insertion opening 22 and the second insertion opening 25 by only pressing the cover material fastening clip 10 within the wide range illustrated in FIGS. 8 and 9 and moving the cover material fastening clip 10 horizontally. Accordingly, the locking operation is simplified. In addition, since it is not necessary to accurately position the cover material fastening clip 10, the cover material fastening clip 10 can be simply operated in the groove 34 of the cushion material 30, can be efficiently operated with a weak force without pressing and deforming the cushion material 30 to cause the wire 36 to appear, needs no skill, and can be simply attached by anyone.

When the cover material fastening clip 10 is removed from the wire 36, it is possible to remove the cover material fastening clip 10 with a simple operation using the jig 46 having a sample structure and to enhance working efficiency. Since the jig 46 for removal from the wire 36 can be simply operated in the groove 34 of the cushion material 30 without being hindered by the cushion material 30, it is not necessary to press and deform the cushion material 30 to cause the jig 46 to appear and it is possible to efficiently perform the operation with a weak force. When the cover material fastening clip 10 is removed from the wire 36, the jig 46 can be easily inserted and locked into the holding space 20a or 21a by only inserting the jig 46 into the first insertion opening 22 or the second insertion opening 25 from the upper side. Accordingly, the attachment can be easily performed without being dropped. By only raising the jig 46 in one direction, the cover material fastening clip 10 rotates about the wire 36, the wire 36 is easily removed from the first insertion opening 22 or the second insertion opening 25 of the first hook piece 20 or the second hook piece 21 which is enlarged by elastic deformation, and it is thus possible to simply carry out disengagement. Accordingly, a hard operation of twisting the jig in a specific direction or the like is not necessary and the operation can be simply performed by anyone.

Since the hook portion 19 is connected to the locking claw base portion 14 of the locking claws 12 via the guide portion 18, a fastening load transmission path from the wire 36 to the cover material 32 via the hook portion 19, the locking claws 12, the locking end member 42, and the locking tape 40 can be set to be linear and it is thus possible to satisfactorily fasten the cover material 32. Since the hook portion 19 includes the first hook piece 20 and the second hook piece 21 which are formed symmetric, the wire 36 or the jig 46 can engage with any of the first hook piece 20 and the second hook piece 21. In addition, when the cover material fastening clip 10 is attached to the locking end member 42, a labor of matching the lateral directions thereof is not necessary and it is thus possible to carry out the attachment with high working efficiency.

Figure 12:
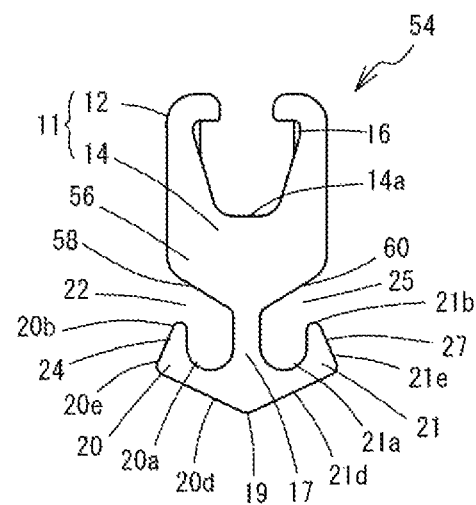
FIG. 12 is a front view of a cover material fastening clip according to a second embodiment of the present invention.

A second embodiment of the present invention will be described below with reference to FIG. 12. Here, the same members as in the above-mentioned embodiment will be referenced by the same reference numerals and description thereof will not be repeated. In a cover material fastening clip 54 according to this embodiment, a guide portion 56 is formed in a block shape as a unified body along with the locking claw base portion 14. The guide portion 56 is connected to the opposite surface of the top surface 14a of the locking claw base portion 14 and the extending portion 17 and is formed in a triangular shape in which the portion connected to the extending portion 17 is separated away from the top surface 14a. An oblique side of the guide portion 56 on the first hook piece 20 side serves as a first upper guide surface 58 which is inclined toward the bottom portion of the holding space 20a. Similarly to the above-mentioned embodiment, the contact surface 20e of the first hook piece 20 serves as the first lower guide surface 24 which is inclined toward the first insertion opening 22. The gap between the first upper guide surface 58 and the first lower guide surface 24 gradually decreases toward the first insertion opening 22 to form the same triangular leading passage as in the above-mentioned embodiment. The first upper guide surface 58 is located on the extending portion 17 side over the extension line of the leading end portion 20b of the first hook piece 20 and is located above the holding space 20a. Accordingly, when the wire 36 or the jig 46 is inserted, the wire 36 or the jig 46 can be smoothly guided to the holding space 20a.

An oblique side of the guide portion 56 on the second hook piece 21 side serves as a second upper guide surface 60 which is inclined toward the bottom portion of the holding space 21a. Similarly to the above-mentioned embodiment, the contact surface 21e of the second hook piece 21 serves as the second lower guide surface 27 which is inclined toward the second insertion opening 25. The gap between the second upper guide surface 60 and the second lower guide surface 27 gradually decreases toward the second insertion opening 25 to form the same triangular leading passage as in the above-mentioned embodiment. The second upper guide surface 60 is located on the extending portion 17 side over the extension line of the leading end portion 21b of the second hook piece 21 and is located above the holding space 21a. Accordingly, when the wire 36 or the jig 46 is inserted, the wire 36 or the jig 46 can be smoothly guided to the holding space 20a.

The cover material fastening clip 54 according to this embodiment has the same usage and the same advantages as in the above-mentioned embodiment. Since the guide portion 56 does not have a hollow structure but has a block shape as a unified body along with the locking claw base portion 14, the strength is high. Accordingly, it is possible to attach the cover material 32 to the cushion material 30 with large strength and to enhance durability.

Figure 13:
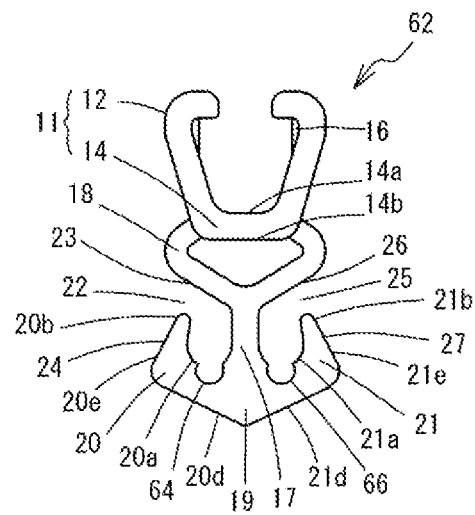
FIG. 13 is a front view of a cover material fastening clip according to a third embodiment of the present invention.
Figure 14:
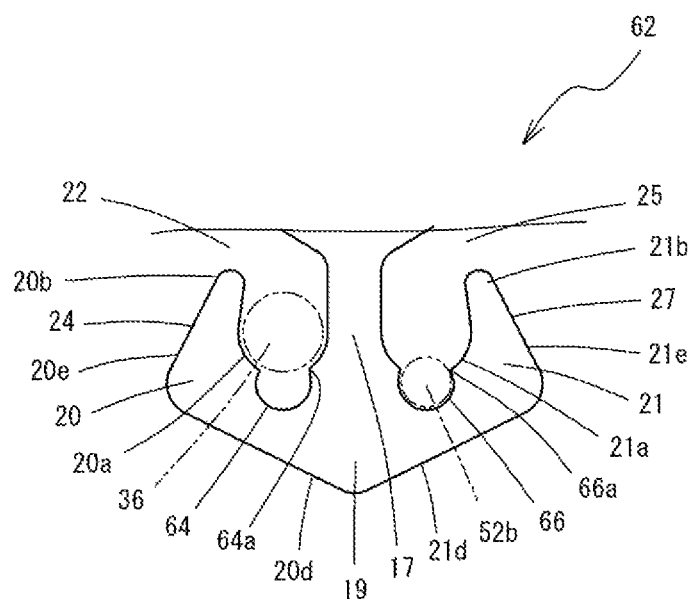
FIG. 14 is an enlarged front view illustrating usage of the cover material fastening clip according to the third embodiment of the present invention.

A third embodiment of the present invention will be described below with reference to FIGS. 13 and 14. Here, the same members as in the above-mentioned embodiment will be referenced by the same reference numerals and description thereof will not be repeated. In a cover material fastening clip 62 according to this embodiment, a jig groove 64 to which the locking portion 52b of the jig 46 is fitted is formed along the X axis direction on the bottom portion of the holding space 20a of the first hook piece 20. A part of a cylinder of the jig groove 64 communicates with the inner circumferential surface of the holding space 20a, and the opening 64a communicating with the holding space 20a is set to have a width smaller than the diameter of the jig groove 64. A jig groove 66 having the same shape as the jig groove 64 is formed to be connected via the opening 66a in the second hook piece 21.

In this embodiment, the diameter of the locking portion 52b of the jig 46 which is used to remove the cover material fastening clip 62 from the wire 36 is smaller than the diameter of the wire 36. The diameter of the jig grooves 64 and 66 is set to such a value to fit the locking portion 52b thereto with a slight margin.

A step of removing the cover material fastening clip 62 from the wire 36 will be described below with reference to an example in which the wire 36 is attached to the first hook piece 20 of the cover material fastening clip 62. Similarly to the above-mentioned embodiment, the jig 46 is inserted into the side of the cover material fastening clip 62 opposite to the wire 36 in the groove 34 of the cushion material 30 and the locking portion 52b of the locking member 52 is pressed against the second insertion opening 25 of the second hook piece 21 which does not engage with the wire 36. Since the locking portion 52b is narrower than the second insertion opening 25, the locking portion 52b is inserted into the holding space 21a through the second insertion opening 25 without elastically deforming the second hook piece 21 and comes in contact with the opening 66a formed in the holding space 21a. The opening 66a has a diameter smaller than the diameter of the locking portion 52b and the locking portion 52b cannot pass therethrough without any change. However, when the jig 46 is additionally pushed upward in this state, the second hook piece 21 is elastically deformed, the opening 66a is enlarged to the diameter of the locking portion 52b, and the locking portion 52b is inserted into the jig groove 66 through the opening 66a as illustrated in FIG. 14. After the locking portion 52b is inserted, the elastic deformation of the second hook piece 21 is restored and the opening 66a is returned to a narrowed state to prevent dropping of the locking portion 52b. Accordingly, the jig 46 is locked to the cover material fastening clip 62.

Then, when the jig 46 is raised, the cover material fastening clip 62 rotates in the counterclockwise direction about the wire 36 with the movement of the locking portion 52b and the wire 36 is located in the first insertion opening 22, the wire 36 comes in contact with the leading end portion 20b, and a force acts in the direction in which the first hook piece 20 is opened. Accordingly, the first hook piece 20 is elastically deformed, the wire 36 passes through the first insertion opening 22, the cover material fastening clip 62 is removed from the wire 36. Accordingly, the cover material 32 is removed from the cushion material 30. The jig 46 is locked to the jig groove 66 even after the cover material fastening clip 62 is removed from the wire 36, but can be easily removed with a hand by opening the second hook piece 21 outward. Accordingly, the force with which the jig 46 is held in the jig groove 66 when the cover material fastening clip 62 is inclined is larger than the force with which the wire 36 is locked to the holding space 21a, and has a magnitude enough to be easily removed with a hand or the like.

Here, an example in which the jig 46 is locked to the jig groove 66 of the second hook piece 21 and the cover material fastening clip 62 is removed from the wire 36 is described, but when the wire 36 is locked to the second hook piece 21, the jig 46 can be locked to the opening 64a of the jig groove 64 of the first hook piece 20 and the cover material fastening clip 62 can be removed from the wire 36 in the same step.

The cover material fastening clip 62 according to this embodiment has the same usage and the same advantages as in the above-mentioned embodiment. Since the locking portion 52b of the jig 46 is narrower than the first insertion opening 22 and the second insertion opening 25 and thus can be easily inserted, it is possible to enhance the efficiency of the operation of attaching the jig 46.

Figure 15:
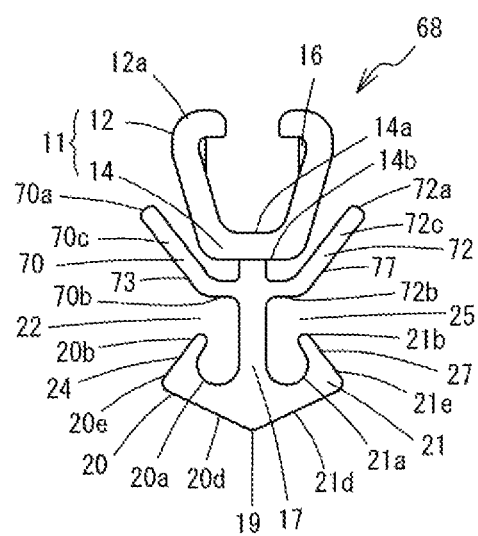
FIG. 15 is a front view of a cover material fastening clip according to a fourth embodiment of the present invention.

A fourth embodiment of the present invention will be described below with reference to FIG. 15. Here, the same members as in the above-mentioned embodiment will be referenced by the same reference numerals and description thereof will not be repeated. In a cover material fastening clip 68 according to this embodiment, the extending portion 17 is connected to the bottom surface 14b of the locking claw base portion 14, and a plate-like guide portion 70 protruding in the protruding direction of the first hook piece 20 is formed in the middle in the length direction of the extending portion 17. The guide portion 70 has a shape in which the portion connected to the extending portion 17 is substantially perpendicular to the extending portion 17 and is bent in the middle and a leading end portion 70a thereof extends to the leading end portions 12a of the locking claws 12.

The surface of the guide portion 70 on the first hook piece 20 side includes a first guide surface base portion 70b which is connected to the extending portion 17 and a first guide surface leading end portion 70c which is connected to the first guide surface base portion 70b, is bent, and extends to the leading end portion 12a side, and forms a first upper guide surface 73. The first upper guide surface 73 including the first guide surface base portion 70b and the first guide surface leading end portion 70c is formed to be planar and both planes are connected to intersect each other. The portion of the first guide surface base portion 70b connected to the extending portion 17 is curved toward the bottom portion of the holding space 20a. The contact surface 20e of the first hook piece 20 serves as a first lower guide surface 24 which is inclined to the first insertion opening 22 similarly to the above-mentioned embodiments. The gap between the first upper guide surface 73 and the first lower guide surface 24 gradually decreases toward the first insertion opening 22 to form a triangular leading passage. The first upper guide surface 73 is located outside in the horizontal direction of the leading end portion 20b of the first hook piece 20 and the first guide surface base portion 70b is located above the holding space 20a. Accordingly, when the wire 36 or the jig 46 is inserted, the wire 36 or the jig 46 can be smoothly guided to the holding space 20a.

A plate-like guide portion 72 protruding in the protruding direction of the second hook piece 21 is formed in the middle in the length direction of the extending portion 17, and the guide portion 72 has a shape in which the guide portion 72 and the guide portion 70 are symmetric with respect to the guide portion 70. The guide portion 72 has a shape in which the portion connected to the extending portion 17 is substantially perpendicular to the extending portion 17 and is bent in the middle and a leading end portion 70a thereof extends to the leading end portion 12a of the locking claw 12.

The surface of the guide portion 72 on the second hook piece 21 side includes a second guide surface base portion 72b which is connected to the extending portion 17 and a second guide surface leading end portion 72c which is connected to the second guide surface base portion 72b, is bent, and extends to the leading end portion 12a side, and forms a second upper guide surface 77. The second upper guide surface 77 including the second guide surface base portion 72b and the second guide surface leading end portion 72c is formed to be planar and both planes are connected to intersect each other. The portion of the second guide surface base portion 72b connected to the extending portion 17 is curved toward the bottom portion of the holding space 21a. The contact surface 21e of the second hook piece 21 serves as a second lower guide surface 27 which is inclined to the second insertion opening 25 similarly to the above-mentioned embodiments. The gap between the second upper guide surface 77 and the second lower guide surface 27 gradually decreases toward the second insertion opening 25 to form a triangular leading passage. The second upper guide surface 77 is located outside in the horizontal direction of the leading end portion 21b of the second hook piece 21 and the second guide surface base portion 72b is located above the holding space 21a. Accordingly, when the wire 36 or the jig 46 is inserted, the wire 36 or the jig 46 can be smoothly guided to the holding space 21a.

The cover material fastening clip 68 according to this embodiment has the same usage and the same advantages as in the above-mentioned embodiments. The first guide surface base portion 70b, the first guide surface leading end portion 70c, the second guide surface base portion 72b, and the second guide surface leading end portion 72c can be formed to be long and thus the wire 36 can be guided in a wide range. Accordingly, it is possible to facilitate attachment to the wire 36 and to further enhance the working efficiency.

Figure 16:
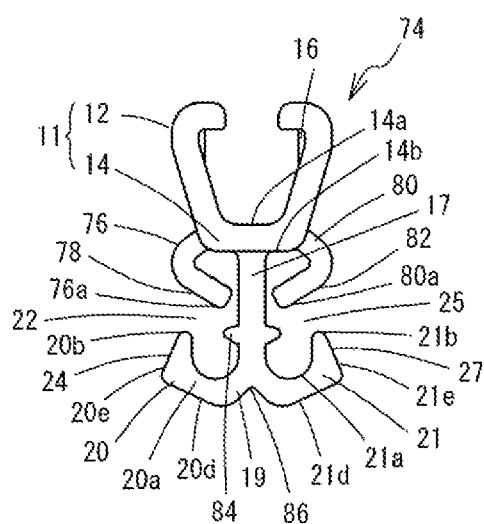
FIG. 16 is a front view of a cover material fastening clip according to a fifth embodiment of the present invention.

A fifth embodiment of the present invention will be described below with reference to FIG. 16. Here, the same members as in the above-mentioned embodiment will be referenced by the same reference numerals and description thereof will not be repeated. In a cover material fastening clip 74 according to this embodiment, the extending portion 17 is formed to be connected to the bottom surface 14b of the locking claw base portion 14. Guide portions 76 and 80 are respectively formed at base end portions of a pair of locking claws 12, which are at both end portions of the bottom surface 14b opposite to the top surface 14a of the locking claw base portion 14.

The guide portion 76 is formed to protrude toward the first hook piece 20 and has a shape which protrudes downward from the bottom surface 14b and extends to be separated away from the extending portion 17 as it is separated away from the bottom surface 14b and in which a leading end portion 76a thereof is bent toward the extending portion 17 in the middle and the longitudinal-section has a V shape. In a portion of the guide portion 76 between the bent portion and the leading end portion 76a, the surface facing the first hook piece 20 serves as a first upper guide surface 78 and the leading end portion 76a side of the first upper guide surface 78 is inclined toward the bottom portion of the holding space 20a. The contact surface 20e of the first hook piece 20 serves as a first lower guide surface 24 which is inclined toward the first insertion opening 22 similarly to the above-mentioned embodiments. The gap between the first upper guide surface 78 and the first lower guide surface 24 gradually decreases toward the first insertion opening 22 to form a triangular leading passage.

The first upper guide surface 78 is located to be closer to the extending portion 17 than the extension line of the leading end portion 20b of the first hook piece 20 and is located above the holding space 20a. Accordingly, when the wire 36 or the jig 46 is inserted, the wire 36 or the jig 46 can be smoothly guided to the holding space 21a.

The guide portion 80 is formed to protrude toward the second hook piece 21. The guide portion 80 is formed to be symmetric to the guide portion 76 with respect to the extending portion 17. The guide portion 80 has a shape which protrudes downward from the bottom surface 14b and extends to be separated away from the extending portion 17 as it is separated away from the bottom surface 14b and in which a leading end portion 80a thereof is bent toward the extending portion 17 in the middle and the longitudinal-section has a V shape. In a portion of the guide portion 80 between the bent portion and the leading end portion 80a, the surface facing the second hook piece 21 serves as a second upper guide surface 82 and the leading end portion 80a side of the second upper guide surface 80 is inclined toward the bottom portion of the holding space 21a. The contact surface 21e of the second hook piece 21 serves as a second lower guide surface 27 which is inclined toward the second insertion opening 25 similarly to the above-mentioned embodiments. The gap between the second upper guide surface 82 and the second lower guide surface 27 gradually decreases toward the second insertion opening 25 to form a triangular leading passage.

The second upper guide surface 82 is located on the extending portion 17 side over the extension line of the leading end portion 21b of the second hook piece 21 and is located above the holding space 21a. Accordingly, when the wire 36 or the jig 46 is inserted, the wire 36 or the jig 46 can be smoothly guided to the holding space 21a.

In the middle in the length direction of the extending direction 17, a pair of protrusions 84 are formed to protrude in the same direction as the protruding direction of the first upper guide surface 78 and the guide portion 80. The protrusions 84 are respectively formed in a triangular shape to protrude at the positions facing the leading end portion 20b and the leading end portion 21b of the first hook piece 20 and the second hook piece 21 and serve to narrow the first insertion opening 22 and the second insertion opening 25.

At the leading end portion of the extending portion 17, a concave portion 86 is formed between the inclined surface 20d of the first hook piece 20 and the inclined surface 21d of the second hook piece 21 so as to define the inclined surfaces 20d and 21d.

When the cover material fastening clip 74 is attached to the wire 36, the cover material fastening clip 74 attached to the cover material 32 is matched with the groove 34 of the cushion material 30, the hook portion 19 of the cover material fastening clip 74 is pressed against the wire 36 with a finger or the like. At this time, the cover material fastening clip 74 can be moved horizontally so as to match the wire 36 with the first insertion opening 22. When the cover material fastening clip 74 is further pressed in this state, the wire 36 is guided along the inclined surface 20d of the first hook piece 20 and is guided between the first upper guide surface 78 and the first lower guide surface 24. The concave portion 86 is formed between the inclined surface 20d and the inclined surface 21d to define the inclined surfaces. Accordingly, when the wire 36 comes in contact with the concave portion 86, a user can feel concaveness with a hand's feeling to grasp the contact and can move the cover material fastening clip in contact with the inclined surface 20d to bring the cover material fastening clip into accurate contact with the wire 36.

The cover material fastening clip 74 according to this embodiment has the same usage and the same advantages as in the above-mentioned embodiments. When the wire 36 is brought into contact with the first insertion opening 22, the concave portion 86 is formed between the inclined surface 20d and the inclined surface 21d to define the inclined surfaces and thus a user can feel concaveness with a hand's feeling to grasp the contact of the wire 36 with the concave portion 86 and can move the cover material fastening clip in contact with the inclined surface 20d or the inclined surface 21d to bring the cover material fastening clip into accurate contact with the wire 36. Since the holding portion 48 is formed to protrude in the vicinity of the first insertion opening 22, it is possible to more satisfactorily prevent dropping of the wire 36.

Figure 17:
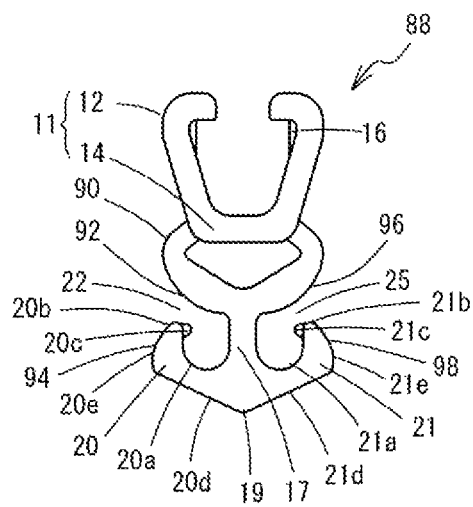
FIG. 17 is a front view of a cover material fastening clip according to a sixth embodiment of the present invention.

A sixth embodiment of the present invention will be described below with reference to FIG. 17. Here, the same members as in the above-mentioned embodiment will be referenced by the same reference numerals and description thereof will not be repeated. In a cover material fastening clip 88 according to this embodiment, a guide portion 90 is formed on both end portions of the bottom surface 14b in the direction in which a pair of locking claws 12 face each other and has a rhombic shape in which a pair of sides protrude downward from the bottom surface 14b thereof, extend to increase a gap therebetween as both sides are separated away from the bottom surface 14b, and are bent to be inclined to approach each other in the middle way thereof. The hook portion 19 is formed on the side of the guide portion 90 opposite to the bottom surface 14b.

The lower surface of the guide portion 90 facing the leading end portion 20b of the first hook piece 20 serves as a first upper guide surface 92 which is inclined toward the bottom portion of the holding space 20a. The first upper guide surface 92 is formed as a curved surface in which the central portion swells toward the leading end portion 20b of the first hook piece 20. The contact surface 20e of the first hook piece 20 serves as a first lower guide surface 94 which is inclined toward the first insertion opening 22 and is formed as a curved surface which swells outward. The gap between the first upper guide surface 92 and the first lower guide surface 94 gradually decreases toward the first insertion opening 22 to form a triangular leading passage. Since the first upper guide surface 92 and the first lower guide surface 94 are formed as curved surfaces, the gap therebetween rapidly decreases toward the first insertion opening 22. The first upper guide surface 92 is located on the extending portion 17 side over the extension line of the leading end portion 20b of the first hook piece 20 and is located above the holding space 20a. Accordingly, when the wire 36 or the jig 46 is inserted, the wire 36 or the jig 46 can be smoothly guided to the holding space 20a.

The lower surface of the guide portion 90 facing the leading end portion 21b of the second hook piece 21 serves as a second upper guide surface 96 which is inclined toward the bottom portion of the holding space 21a and is formed as a curved surface which swells outward similarly to the first upper guide surface 92. The contact surface 21e of the second hook piece 21 serves as a second lower guide surface 98 which is inclined toward the second insertion opening 25 and is formed as a curved surface which swells outward similarly to the first lower guide surface 94. The gap between the second upper guide surface 96 and the second lower guide surface 98 decreases toward the second insertion opening 25 to form a triangular leading passage. Since the second upper guide surface 96 and the second lower guide surface 98 are formed as curved surfaces, the gap therebetween rapidly decreases toward the second insertion opening 25. The second upper guide surface 96 is located on the extending portion 17 side over the extension line of the leading end portion 21b of the second hook piece 21 and is located above the holding space 21a. Accordingly, when the wire 36 or the jig 46 is inserted, the wire 36 or the jig 46 can be smoothly guided to the holding space 21a.

The cover material fastening clip 88 according to this embodiment has the same usage and the same advantages as in the above-mentioned embodiments. Since the first upper guide surface 92, the first lower guide surface 94, the second upper guide surface 96, and the second lower guide surface 98 are formed in an arc shape, the leading passage is rapidly narrowed toward the first insertion opening 22 and the second insertion opening 25 and it is thus possible to satisfactorily guide the wire 36 to the first insertion opening 22 or the second insertion opening 25.

The cover material fastening clip according to the present invention is not limited to the above-mentioned embodiments, and the detailed shapes, the sizes, and the like can be appropriately modified. The material of the cover material fastening clip, the finishing of the surfaces, the colors, and the like can be freely selected. Regarding the width in the thickness direction intersecting the direction in which a pair of locking claws faces each other in the cover material fastening clip, the locking claws and the locking claw base portion are set to be wider than the guide portion and the hook portion and the guide portion and the hook portion are set to be narrower than the locking claws and the locking claw base portion, but these may have the same width or may have the reversed widths. In order to guarantee deformation performance, it is preferable that the guide portion or the hook portion is set to have a small width. The leading end portions of the locking claws are formed in a chamfered shape, but may have a rectangular shape. However, by employing the chamfered shape, it is possible to reduce interference with the locking end member. The pair of guide portions and the pair of hook pieces are formed to be symmetric with respect to the extending portion, but may be formed in different shapes instead of the symmetric shape.

What is claimed is:

1. A cover material fastening clip for attaching a cover material to a cushion material, comprising:
    a locking portion configured to be locked to a locking end member disposed at an edge of the cover material;
    a hook portion configured to be locked to a wire disposed in a groove of the cushion material; and
    a guide portion configured to guide the wire to the hook portion, wherein the hook portion is formed below the locking portion and the hook portion is provided with an extending portion that extends downward from the locking portion, a first hook piece that extends laterally from a leading end portion of the extending portion in an extending direction thereof, and a second hook piece that extends to an opposite side of the first hook piece, wherein the guide portion is formed in the extending portion and is provided with a first guide portion located above the first hook piece and between the first hook piece and the locking portion and a second guide portion located above the second hook piece and between the second hook piece and the locking portion, wherein a space between a leading end portion of the first hook piece and the first guide portion serves as a first insertion opening with a predetermined gap, and wherein a space between a leading end portion of the second hook piece and the second guide portion serves as a second insertion opening with a predetermined gap.

2. The cover material fastening clip according to claim 1, wherein a portion of the first guide portion facing the first insertion opening forms a first upper guide surface, wherein a portion of the first hook piece facing the first insertion opening forms a first lower guide surface, wherein a gap between the first upper guide surface and the first lower guide surface is gradually narrowed toward the first insertion opening, wherein a portion of the second guide portion facing the second insertion opening forms a second upper guide surface, wherein a portion of the second hook piece facing the second insertion opening forms a second lower guide surface, and wherein a gap between the second upper guide surface and the second lower guide surface is gradually narrowed toward the second insertion opening.

3. The cover material fastening clip according to claim 2, wherein an inclined surface inclined upwardly toward a lateral side from the extending portion is formed at an end portion of the first hook piece in the extending direction of the extending portion, and wherein an inclined surface inclined upwardly toward a lateral side from the extending portion is formed at an end portion of the second hook piece in the extending direction of the extending portion.

4. The cover material fastening clip according to claim 2, wherein the first upper guide surface and the first lower guide surface are arranged such that extension lines thereof intersect each other at an angle of 80° to 120°, and wherein the second upper guide surface and the second lower guide surface are arranged such that extension lines thereof intersect each other at an angle of 80° to 120°.

5. The cover material fastening clip according to claim 1, wherein the first hook piece and the second hook piece, and the first guide portion and the second guide portion are formed to be symmetric with respect to a center line of the extending portion in the extending direction thereof.

6. The cover material fastening clip according to claim 1, wherein the first hook piece and the second hook piece are arranged so as to lock a jig for removing the first hook piece and the second hook piece from the wire.

7. The cover material fastening clip according to claim 6, wherein a holding space for holding the wire is formed in the first hook piece and the second hook piece, and a jig groove to which the jig is fitted is formed on a bottom portion of the holding space.

8. The cover material fastening clip according to claim 1, wherein the first guide portion and the second guide portion are formed in a rhombic shape in which first guide portion and the second guide portion protrude downward from a bottom surface of the locking portion, extend so as to increase a gap between the first guide portion and the second guide portion as the first guide portion and the second guide portion are separated away from the bottom surface of the locking portion, and are bent so as to be inclined to approach each other at middle portions of the first guide portion and the second guide portion.

* * * * *